Oct. 1, 1963  E. SAITO  3,105,737
SEPARATION OF THE ISOTOPES OF LITHIUM
Filed April 23, 1959

Oct. 1, 1963    E. SAITO    3,105,737
SEPARATION OF THE ISOTOPES OF LITHIUM
Filed April 23, 1959    4 Sheets-Sheet 2

Oct. 1, 1963 E. SAITO 3,105,737
SEPARATION OF THE ISOTOPES OF LITHIUM
Filed April 23, 1959 4 Sheets-Sheet 4

United States Patent Office 3,105,737
Patented Oct. 1, 1963

3,105,737
SEPARATION OF THE ISOTOPES OF LITHIUM
Eiichi Saito, Gif-sur-Yvette, France, assignor to Commissariat a l'Energie Atomique, Paris, France
Filed Apr. 23, 1959, Ser. No. 808,331
Claims priority, application France, Apr. 25, 1958
12 Claims. (Cl. 23—89)

The present invention is concerned with improvements in or relating to the separation of the isotopes of lithium. It has been proposed to separate the isotopes of lithium by isotopic exchange between lithium bromide dissolved in absolute alcohol and lithium amalgam. However, in this process a large part of the lithium reacts with the alcohol to form an alcoholate and as a consequence the separation is inefficient.

We have now developed a modification of this process which enables the isotopes of lithium to be separated efficiently.

According to the present invention there is provided a process for separating the isotopes of lithium which consists of a plurality of stages each of which comprises continuously passing lithium amalgam and a solution of a lithium salt in an organic solvent countercurrently through a contact zone, a first return circuit wherein the lithium content of the organic solution leaving the contact zone is continuously extracted therefrom and converted into further amalgam and the latter is then passed to the contact zone, and a second return circuit wherein the lithium content of the amalgam leaving the contact zone is continuously extracted therefrom and formed into further of said organic solution and the latter is then passed to the contact zone.

The organic solvent employed is conveniently one which does not react, or reacts only slightly, with lithium. It may also be advantageous for the organic solvent to be capable of conducting current.

In a preferred embodiment of the invention, the organic solvent is dimethyl formamide and the salt is lithium bromide; for this particular choice of solvent and salt, the separation factor is 1.05. In the process according to the invention, the lithium amalgam, which is divided into fine droplets, passes countercurrently to the lithium salt solution in the contact zone and in so doing the amalgam becomes enriched in $^6$Li, and the solution becomes enriched in $^7$Li. In this embodiment of the process, the first return circuit is carried out in the following fashion: after the solvent has been evaporated from the solution, the lithium salt is dissolved in water and the aqueous solution electrolysed wtih a mercury cathode; the amalgam thus formed is returned to the amalgam input end, normally the top, of the contact apparatus. The second return circuit is carried out in the following fashion: the amalgam is reacted with aqueous hydrobromic acid and after evaporation of the aqueous solution obtained, the dry lithium bromide is re-dissolved in dimethyl formamide; the solution is then returned to the solution input end, normally the bottom, of the contact apparatus.

In other preferred embodiments of the invention, a solution of lithium chloride in dimethyl formamide, and a solution of lithium bromide in tetrahydrofuran are employed instead of the above-described solution of lithium bromide in dimethyl formamide.

In order that the invention may be more fully understood, the process according to the invention will now be described, by way of example, in relation to certain embodiments of apparatus in which it can be carried out and with reference to the accompanying diagrammatic drawings, in which.

Only the elements necessary for an understanding of the invention are illustrated in the accompanying drawings and the same reference numerals are used to designate the same or similar components.

Figure 1:
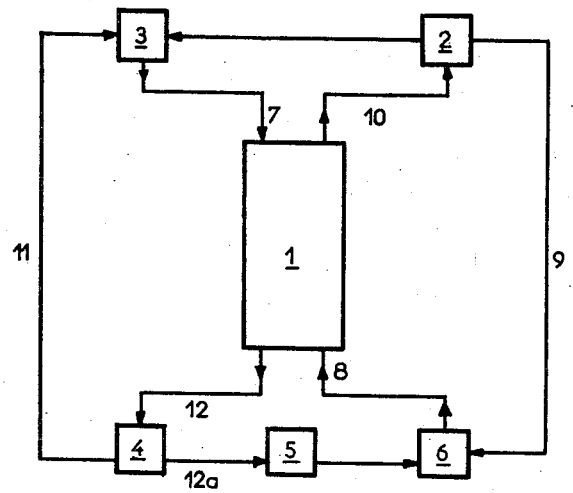
FIGURE 1 is a general illustration of apparatus for carrying out a stage of the process according to the invention.

The apparatus of FIGURE 1 comprises a contact apparatus 1, a first return circuit including an evaporator 2 and an electrolyser 3, and a second return circuit including a mercury separator 4, an evaporator 5 and a dissolving tank 6.

The contact apparatus 1 may consist of a single column through which the amalgam and the organic solution are passed countercurrently. The lithium amalgam is introduced through a conduit 7 at the top of the column 1, and is converted into fine droplets by being passed through a sprinkler rose. The solution, for example of lithium bromide in dimethyl formamide, is conveyed via a conduit 8 to the bottom of the column 1. A pump, not shown, forces the solution upwards through the column 1, while the amalgam descends by gravity.

The first return circuit including the evaporator 2 and the electrolyser 3 operates in the following manner: The dimethyl formamide is distilled in the evaporator 2 and then returned via a conduit 9 to the dissolving tank 6. Since the evaporator 2 is continuously supplied with solution via a conduit 10, there must, in fact, be two evaporators, such as 2, arranged in parallel, in order to allow the solid lithium bromide to be recovered. In the electrolyser 3, which may, for example, be an electrolysis tank with a mercury cathode, the lithium salt dissolved in water is electrolysed, and the lithium is discharged onto the mercury cathode, dissolving there to produce further amalgam. The latter is conveyed via the conduit 7 to the column 1. The electrolyser 3 is supplied with fresh mercury via a conduit 11.

The second return circuit including the mercury separator 4, the evaporator 5 and the dissolving tank 6 operates in the following manner: The lithium amalgam which is introduced into the mercury separator 4 via a conduit 12 from the column 1 is treated with an aqueous solution of an hydrohalide acid, hydrobromic acid in the example chosen. The mercury which has been freed of lithium is returned via the conduit 11 to the electrolyser 3; the lithium bromide solution obtained is conveyed via a pipe 12a to the evaporator 5. Since the evaporator 5 is continuously supplied, there are, in fact, two evaporators in parallel in order that the lithium salt may be recovered and conveyed to the dissolving tank 6; the tank 6 is applied with solvent via the conduit 9. The solution formed in the tank 6 is picked up by the above-mentioned pump and conveyed via the conduit 8 to the column 1.

Figure 2:
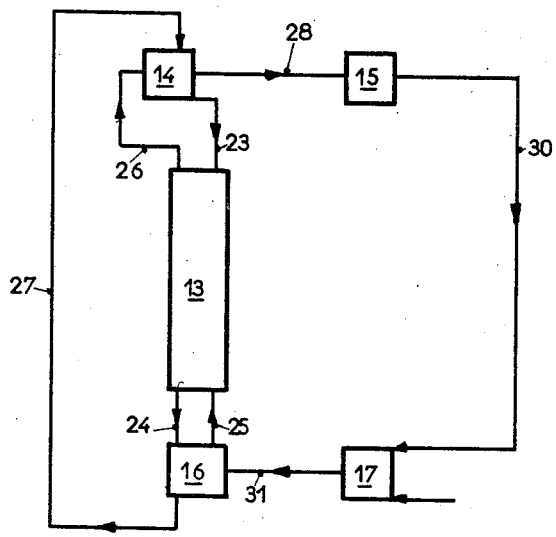
FIGURE 2 illustrates further apparatus for carrying out a stage of the process according to the invention.

FIGURE 2 shows another type of apparatus which operates in completely continuous fashion and which comprises a contact apparatus 13, a first return circuit including an electrolyser 14 and a distillation column 15, and a second return circuit including a separator column 16 and a saturator 17.

Figure 3:
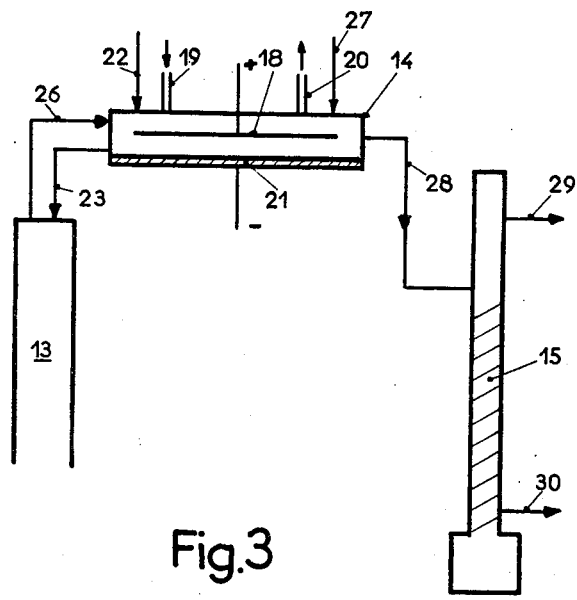
FIGURE 3 is a detailed illustration of the first return circuit of the apparatus illustrated in FIGURE 2.
Figure 4:
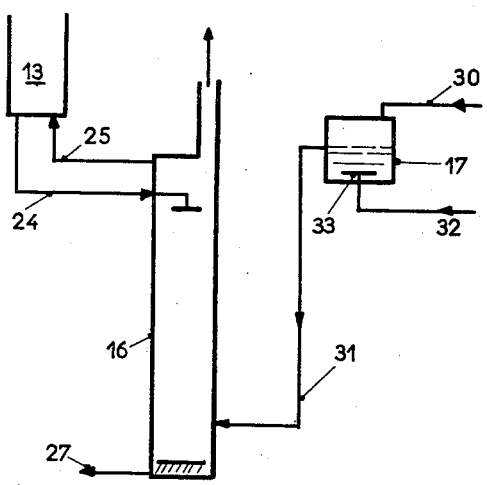
FIGURE 4 is a detailed illustration of the second return circuit of the apparatus illustrated in FIGURE 2.

FIGURE 3 shows details of the electrolyser 14 and the distillation column 15 of the apparatus of FIGURE 2, the electrolyser 14 comprising an anode 18, a compressed air inlet 19, a compressed air outlet 20, a mercury cathode 21 and a water inlet 22. FIGURE 4 shows details of the second return circuit including the separator column 16 and the saturator 17 of the apparatus illustrated in FIGURE 3.

The apparatus illustrated in FIGURES 2, 3 and 4 will be described in relation to the use of lithium chloride and of dimethyl formamide as the solvent.

The contact apparatus 13 consists of a pulsed column. The amalgam is introduced via a conduit 23 at the top of the column, and emerges via a conduit 24. The lithium chloride solution is introduced via a conduit 25 at the bottom of the column 13, and emerges via a conduit 26.

The solution of lithium chloride in dimethyl formamide proceeds via the conduit 26 to the electrolyser 14, which consists of a horizontal tube; the injection of water through the water inlet 22 renders the solution more conductive and encourages the deposit of lithium in the mercury. The flow of compressed air introduced through the inlet 19 causes the chlorine liberated by electrolysis to be discharged through the outlet 20. Mercury from the separator column 16 enters the electrolyser 14 through a conduit 27. The $H_2O$-dimethyl formamide mixture is conveyed via a conduit 28 from the electrolyser 14 to the distillation column 15; in the latter the water is vaporised and removed via a conduit 29, dimethyl formamide having a boiling point of 153° C.

The pure dimethyl formamide removed from the base of the column 15 is conveyed by a conduit 30 to the saturator 17.

The amalgam leaving the column 13 through the conduit 24 is conveyed in the form of fine droplets to the separator column 16 which is filled with solvent containing dry hydrochloric acid. The amalgam is decomposed, giving lithium chloride, which dissolves in the solvent, and hydrogen is liberated. The mercury recovered is conveyed by the conduit 27 to the electrolyser 14.

Solvent enters the separator column 16 through a conduit 31 under hydrostatic pressure if the saturator 17 is disposed as indicated in FIGURE 4, recycling of the lithium chloride solution via the conduit 25 then being ensured by the pulsation system, which is not illustrated in the figure. In the saturator 17, the dimethyl formamide introduced through the conduit 30 from the distillation column 15 is charged with hydrochloric acid which is introduced from a reservoir, not illustrated in the figure, via a conduit 32 which terminates in a distributor 33.

Figure 5:
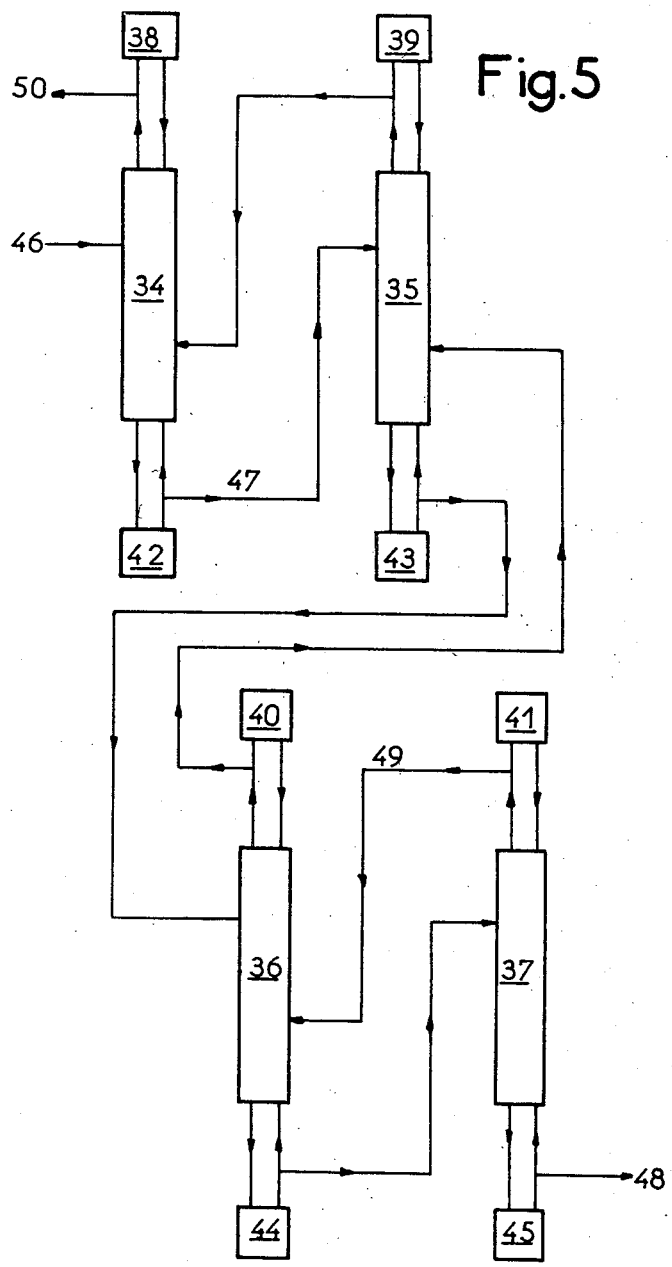
FIGURE 5 illustrates apparatus embodying a cascade arrangement of a plurality of stages according to the invention, in series, which enables $^6$Li to be obtained.

FIGURE 5 shows a cascade arrangement of four stages according to the invention in series, which comprises contact apparatuses 34, 35, 36, 37, first return circuits 38, 39, 40, 41 and second return circuits 42, 43, 44, 45.

Natural lithium is introduced into the contact apparatus 34 at 46. Lithium enriched with $^6Li$ is taken off in the form of a solution between the contact apparatus 34 and the second return circuit 42; it is introduced into the contact apparatus 35 via a conduit 47 at a point of isoconcentration. The same applies to the other stages, extraction of the final product being effected at 48.

Lithium depleted in $^6Li$ is taken off in the form of a lithium salt solution between the contact apparatus 37 and the first return circuit 41, and is re-injected via a conduit 49 into the contact apparatus 36 at a point of isoconcentration. The same applies to the other stages. The product depleted in $^6Li$ is extracted at 50.

The take-offs and re-injections can just as well be effected with amalgam, instead of with solution, without departing from the scope of the invention.

Figure 6:
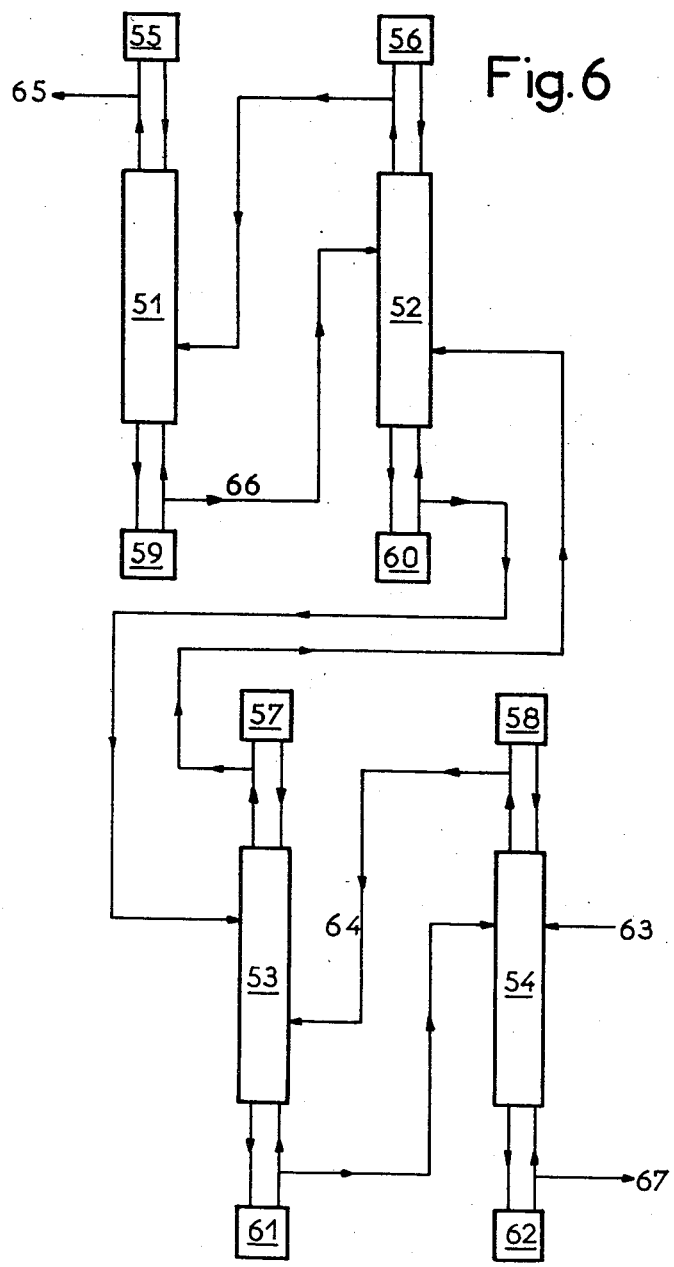
FIGURE 6 illustrates another example of a cascade arrangement which enables $^7$Li to be obtained.

FIGURE 6 shows a cascade arrangement of four stages in series, which comprises contact apparatuses 51, 52, 53, 54, first return circuits 55, 56, 57, 58 and second return circuits 59, 60, 61 and 62.

Natural lithium is introduced into the contact apparatus 54 at 63. Lithium enriched in $^7Li$ is taken off in the form of a lithium salt solution between the contact apparatus 54 and the first return circuit 58; it is introduced into the contact apparatus 53 at a point of isoconcentration via a conduit 64. The same applies to the other stages, extraction of the final product being effected at 65. The lithium depleted in $^7Li$ is taken off in the form of a lithium salt solution between the contact apparatus 51 and the second return circuit 59. It is reinjected via a conduit 66 into the contact apparatus 52 at a point of isoconcentration. The same applies to the other stages. The product depleted in $^7Li$ is extracted at 67.

Two cascade arrangements such as those illustrated in FIGURES 5 and 6 can be grouped together in order to extract $^6Li$ and $^7Li$ simultaneously. The product depleted in $^7Li$ which is extracted at 67 from the cascade arrangement shown in FIGURE 6 would, in such a case, be re-injected into the contact apparatus 34 in the cascade arrangement shown in FIGURE 5. The product depleted in $^6Li$ which is extracted at 50 from the cascade arrangement shown in FIGURE 5 would, in addition be re-injected into the contact apparatus 54 in the cascade arrangement shown in FIGURE 6.

In such an arrangement for the simultaneous extraction of the two isotopes, natural lithium could be supplied independently at 46 in the cascade arrangement shown in FIGURE 5, or at 63 in the cascade arrangement shown in FIGURE 6, or even simultaneously in the two cascade arrangements; $^6Li$ would be obtained at 48 and $^7Li$ at 65.

I claim:

1. A process for separating the $^6Li$ and $^7Li$ isotopes of lithium from each other which consists of a plurality of stages each of which comprises continuously passing lithium amalgam and a solution of a lithium salt selected from the group consisting of lithium bromide and lithium chloride in an organic solvent selected from the group consisting of dimethylformamide and tetrahydrofuran countercurrently through a contact zone, continuously extracting the lithium content of the organic solution leaving the contact zone in a first return circuit and converting said lithium content into further amalgam, then passing said amalgam to the contact zone, and continuously extracting the lithium content of the amalgam leaving the contact zone in a second return circuit and forming said lithium content last named into more of said organic solution and then passing said solution to the contact zone, lithium enriched in $^6Li$ being taken off as a solution between said contact zone and said second return circuit, lithium enriched in $^7Li$ being taken off as a solution between said contact zone and said first return circuit enriched lithium being introduced at points of isoconcentration in the following stage, maintaining the lithium content of the stages by supplying lithium to the stages as lithium amalgam and as said lithium salt in said organic solvent at points of isoconcentration and removing enriched lithium as the amalgam in the organic phase.

2. A process according to claim 1 in which said first continuous extraction in the first return circuit consists of the steps of evaporating to dryness a portion of the organic solution leaving the contact zone, electrolyzing an aqueous solution of the salt thus obtained by a mercury cathode, and conveying a portion of the amalgam thus obtained to the amalgam inlet of the contact zone.

3. A process according to claim 1 in which said second continuous extraction in the second return circuit consists of the steps of treating a portion of the amalgam leaving the contact zone with a volatile acid in aqueous solution selected from the group consisting of hydrobromic acid and hydrochloric acid to convert metallic lithium therein into a soluble lithium salt, evaporating the solution of lithium salt thus obtained to dryness, dissolving the lithium salt in the organic solvent, and then conveying a portion of the organic solution thus obtained to the organic solution inlet of the contact zone.

4. A process according to claim 3 in which the lithium salt employed is lithium bromide; the organic solvent is dimethyl formamide; and the acid used to regenerate the lithium bromide is hydrobromic acid.

5. A process for separating $^6$Li and $^7$Li isotopes of lithium from each other which consists of a plurality of stages each of which comprises continuously passing lithium amalgam and a solution of lithium bromide in dimethylformamide countercurrently through a contact zone, continuously extracting the lithium content of said solution leaving the contact zone in a first return circuit and converting said lithium content to further amalgam, then passing said amalgam to the contact zone, and continuously extracting the lithium content of the amalgam leaving the contact zone in a second return circuit and forming said lithium content last named into more of said lithium bromide in dimethylformamide and then passing said solution to the contact zone, lithium enriched in $^6$Li being taken off as a solution between said contact zone and said second return circuit, lithium enriched in $^7$Li being taken off as a solution between said contact zone and said first return circuit, enriched lithium being introduced at points of isoconcentration in the following stage, maintaining the lithium content of the stages by supplying lithium to the stages as lithium amalgam and as lithium bromide in dimethylformamide at points of isoconcentration and removing enriched lithium as the amalgam in the organic phase.

6. A process for separating the $^6$Li and $^7$Li isotopes of lithium from each other which consists of a plurality of stages each of which comprises continuously passing lithium amalgam and a solution of lithium bromide in tetrahydrofuran with lithium countercurrently through a contact zone, continuously extracting the lithium content of said solution leaving the contact zone in a first return circuit and converting said lithium content into further amalgam, then passing said amalgam to the contact zone, and continuously extracting the lithium content of the amalgam leaving the contact zone in a second return circuit and forming said lithium content last named into more of said lithium bromide in tetrahydrofuran and then passing said solution to the contact zone, lithium enriched in $^6$Li being taken off as a solution between said contact zone and said second return circuit, lithium enriched in $^7$Li being taken off as a solution between said contact zone and said first return circuit, enriched lithium being introduced at points of isoconcentration in the following stage, maintaining the lithium content of the stages by supplying lithium to the stages as lithium amalgam and as lithium in tetrahydrofuran at points of isoconcentration and removing enriched lithium as the amalgam in the organic phase.

7. A process for separating the $^6$Li and $^7$Li isotopes of lithium from each other which consists of a plurality of stages each of which comprises continuously passing lithium amalgam and a solution of lithium chloride in dimethylformamide with lithium countercurrently through a contact zone, continuously extracting the lithium content of the organic solution leaving the contact zone in a first return circuit and converting said lithium content into further amalgam, then passing said amalgam to the contact zone, and continuously extracting the lithium content of the amalgam leaving the contact zone in a second return circuit and forming said lithium content last named into more of said lithium chloride in dimethylformamide solution and then passing said solution to the contact zone, lithium enriched in $^6$Li being taken off as a solution between said contact zone and said second return circuit, lithium enriched in $^7$Li being taken off as a solution between said contact zone and said first return circuit, enriched lithium being introduced at points of isoconcentration in the following stage, maintaining the lithium content of the stages by supplying lithium to the stages as lithium amalgam and as lithium in dimethylformamide at points of isoconcentration and removing enriched lithium as the amalgam in the organic phase.

8. A process as described in claim 5 in which said second continuous extraction in the second return circuit consists of the steps of treating a portion of the amalgam leaving the contact zone with a volatile acid selected from the group consisting of hydrobromic acid and hydrochloric acid in aqueous solution to convert metallic lithium therein into soluble lithium salt, evaporating the solution of lithium salt thus obtained to dryness, dissolving the lithium salt in the dimethylformamide, and then conveying a portion of the organic solution thus obtained to the organic solution inlet of the contact zone.

9. A process as described in claim 6 in which said second continuous extraction in the second return circuit consists of the steps of treating a portion of the amalgam leaving the contact zone with a volatile acid selected from the group consisting of hydrobromic acid and hydrochloric acid in aqueous solution to convert metallic lithium therein into soluble lithium salt, evaporating the solution of lithium salt thus obtained to dryness, dissolving the lithium salt in the tetrahydrofuran, and then conveying a portion of the organic solution thus obtained to the organic solution inlet of the contact zone.

10. A process as described in claim 7 in which said second continuous extraction in the second return circuit consists of the steps of treating a portion of the amalgam leaving the contact zone with a volatile acid selected from the group consisting of hydrobromic acid and hydrochloric acid in aqueous solution to convert metallic lithium therein into the soluble lithium salt, evaporating the solution of lithium salt thus obtained to dryness, dissolving the lithium salt in the dimethylformamide, and then conveying a portion of the organic solution thus obtained to the organic solution inlet of the contact zone.

11. A process according to claim 7 in which the lithium salt employed in lithium chloride; the organic solvent employed is dimethyl formamide; in which said first continuous extraction includes the steps of conveying a portion of the organic solution leaving the contact zone to a mercury cathode electrolyser into which water is injected to provide a more conductive solution, electrolyzing the solution therein, conveying a portion of the amalgam thus obtained to the amalgam inlet of the contact zone, distilling the water-dimethyl formamide mixture, and recovering the organic solvents; and in which said second continuous extraction includes the steps of conveying a portion of the amalgam leaving the contact zone to a separator column into which dimethyl formamide and dry hydrochloric acid are injected, removing from the column the organic solution of lithium chloride obtained and conveying a portion of this organic solution to the organic solution inlet of the contact zone.

12. The process according to claim 1 in which said plurality of stages are connected in series.

References Cited in the file of this patent

UNITED STATES PATENTS

| | | |
|---|---|---|
| 2,204,072 | Dean | June 11, 1940 |
| 2,227,833 | Hixson et al. | Jan. 7, 1941 |

OTHER REFERENCES

Mellor: "Comprehensive Treatise on Inorganic and Theoretical Chemistry," vol. 4, pages 1010–1012.

Lewis and MacDonald: "The Separation of Lithium Isotopes," Jour. Amer. Chem. Soc., vol 58, pages 2519–24.